United States Patent
Hubert et al.

(10) Patent No.: US 6,577,108 B2
(45) Date of Patent: Jun. 10, 2003

(54) VOLTAGE REGULATION OF A UTILITY POWER NETWORK

(75) Inventors: Thomas Gregory Hubert, Necedah, WI (US); Douglas C. Folts, Baraboo, WI (US); Warren Elliott Buckles, Madison, WI (US)

(73) Assignee: American Superconductor Corporation, Westborough, MA (US)

( * ) Notice: Subject to any disclaimer, the term of this patent is extended or adjusted under 35 U.S.C. 154(b) by 0 days.

(21) Appl. No.: 10/196,707

(22) Filed: Jul. 15, 2002

(65) Prior Publication Data

US 2003/0026114 A1 Feb. 6, 2003

Related U.S. Application Data

(63) Continuation of application No. 10/002,847, filed on Nov. 14, 2001, now abandoned, and a continuation of application No. 09/718,672, filed on Nov. 22, 2000, now abandoned.
(60) Provisional application No. 60/167,377, filed on Nov. 24, 1999.

(51) Int. Cl.[7] .............................. G05F 1/70; G05F 3/00; H02M 5/45
(52) U.S. Cl. .......................... 323/207; 323/205; 363/37
(58) Field of Search ................................ 323/205, 207, 323/208; 363/34, 35, 37, 39, 40

(56) References Cited

U.S. PATENT DOCUMENTS

| | | | |
|---|---|---|---|
| 4,962,354 A | | 10/1990 | Visser et al. |
| 5,138,247 A | * | 8/1992 | Tanoue et al. ............... 323/207 |
| 5,343,139 A | * | 8/1994 | Gyugyi et al. ............... 323/207 |
| 5,519,312 A | | 5/1996 | Wang et al. |
| 5,610,501 A | * | 3/1997 | Nelson et al. ............... 323/207 |
| 5,642,007 A | * | 6/1997 | Gyugyi et al. ............... 307/102 |
| 5,644,218 A | | 7/1997 | Emmerich et al. |
| 5,670,864 A | * | 9/1997 | Marx et al. ................. 323/211 |
| 5,698,969 A | * | 12/1997 | Gyugyi ........................ 323/207 |
| 5,734,257 A | * | 3/1998 | Schauder et al. ........... 323/207 |
| 5,814,975 A | * | 9/1998 | Nelson et al. ............... 323/207 |

FOREIGN PATENT DOCUMENTS

| | | |
|---|---|---|
| EP | 0181575 | 5/1986 |
| JP | 59052809 | 3/1984 |
| JP | 5921870 | 12/1984 |
| JP | 01019929 | 1/1989 |
| JP | 05268727 | 10/1993 |
| WO | PCT/US00/31925 | 11/2000 |

OTHER PUBLICATIONS

Rahim et al., IEEE Transactions on Energy Conversion, US, IEEE Inc., 11:175–180, 1996.

"Voltage and Discharge and Magnet and Superconductor" Nerac, Inc., 1999, pp. 5–40.

* cited by examiner

Primary Examiner—Bao Q. Vu
(74) Attorney, Agent, or Firm—Fish & Richardson P.C.

(57) ABSTRACT

Power compensation is provided from a power compensation device to a utility power network carrying a nominal voltage. The power compensation device has a steady-state power delivery characteristic. The power compensation is provided by detecting a change of a predetermined magnitude in the nominal voltage on the utility power network and controlling the power compensation device to deliver, for a first period of time and in response to the detected change in the nominal voltage, reactive power to the utility power network. The power compensation device is controlled to deliver, for a second period of time following the first period of time, reactive power to the utility power network at a level that is a factor N(N>1) greater than the steady-state power delivery characteristic of the power compensation device.

16 Claims, 5 Drawing Sheets

VOLTAGE REGULATION OF A UTILITY POWER NETWORK

CLAIM TO PRIORITY

This application is a continuation (and claims the benefit of priority under 35 USC 120) of U.S. application Ser. No. 10/002,847, filed Nov. 14, 2001, now abandoned of U.S. application Ser. No. 09/718,672, filed Nov. 22, 2000 now abandoned and U.S. Provisional Application Serial No. 60/167,377, filed Nov. 24, 1999. The disclosures of the prior applications are considered part of (and are incorporated by reference in) the disclosure of this application

INCORPORATION BY REFERENCE

The following applications are hereby incorporated by reference into this application as if set forth herein in full: (1) U.S. patent application Ser. No. 09/240,751, entitled "Electric Utility Network With Superconducting Magnetic Energy Storage" and filed on Jan. 29, 1999; (2) U.S. Provisional Application No. 60/117,784, entitled "Electric Utility Network With Superconducting Magnetic Energy Storage" and filed on Jan. 29, 1999; (3) U.S. patent application Ser. No. 09/449,505, entitled "Method and Apparatus for Discharging a Superconducting Magnet" and filed on Nov. 24, 1999; (4) U.S. patent application Ser. No. 09/449,436, entitled "Method and Apparatus for Controlling a Phase Angle" and filed on Nov. 24, 1999; (5) U.S. patent application Ser. No. 09/449,378, entitled "Capacitor Switching" and filed on Nov. 24, 1999; (6) U.S. patent application Ser. No. 09/449,375, entitled "Method and Apparatus for Providing Power to a Utility Network" and filed on Nov. 24, 1999; (7) U.S. patent application Ser. No. 09/449,435, entitled "Electric Utility System with Superconducting Magnetic Energy Storage" and filed on Nov. 24, 1999; and (8) U.S. Provisional Application No. 60/167,377, entitled "Voltage Regulation of a Utility Power Network" and filed on Nov. 24, 1999.

BACKGROUND

This invention relates to electric power utility networks including generating systems, transmission systems, and distribution systems serving loads. In particular, the invention relates to controlling the transfer of energy to and from a utility power network. Energy storage devices, including capacitor banks and superconducting magnetic energy storage devices (SMES), are used to provide power to a utility power network in order to compensate for power shortfalls or voltage instability problems on the network. For example, in the event of a fault or outage on the network, power may be transferred from an energy storage device to the network to ensure that the amount of power on the network remains within acceptable limits.

SUMMARY

The invention features a system for controlling a power compensation device, such as an inverter connected to a utility power network, to operate in an "overload" mode. Operating in an overload mode means operating the power compensation device in excess of its maximum steady-state power delivery characteristic (e.g., power delivery rating). This reduces the cost of heat dissipation elements in the compensating device and reduces the number of solid state switching devices required therein.

In one aspect, the invention is a system that includes a controller which controls a reactive power compensation device to deliver, for a first period of time and in response to a detected change in a nominal voltage, reactive power to the utility power network. In a second period of time following the first period of time, the controller controls the reactive power compensation device to provide reactive power to the utility power network at a level that is a factor N(N>1) greater than a maximum power capability characteristic of the reactive power compensation device.

In another aspect, the invention is directed to providing power compensation from a power compensation device to a utility power network carrying a nominal voltage, the power compensation device having a steady-state power delivery characteristic. This aspect features detecting a change of a predetermined magnitude in the nominal voltage on the utility power network, and controlling the power compensation device to deliver, for a first period of time and in response to the detected change in the nominal voltage, reactive power to the utility power network. The power compensation device is controlled to deliver, for a second period of time following the first period of time, reactive power to the utility power network at a level that is a factor N(N>1) greater than the steady-state power delivery characteristic of the power compensation device.

Having detected and reacted to a change of a predetermined magnitude in the nominal voltage on the utility power network by increasing injected power to a level that is as much as N times higher than the maximum steady-state power delivery characteristic of the compensation device, power injection of the compensating device can be purposefully and gradually reduced to the maximum steady-state value so as not to include a transient response by the network that could result in voltage instability and/or other undesirable events.

Among other advantages, these aspects of the invention provide an approach for operating a reactive power compensation device in an overload mode for a maximum period of time without incurring an abrupt, step-like change in inverter current at the time the overload capability of the compensating device has been expended, thereby forcing the compensating device's current to be at or below a specified level. Thus, as noted, the invention reduces the possibility of undesirable transients (e.g., ringing oscillations) in the utility power network. Furthermore, a substantially optimum ramp down profile can be determined on the basis of the characteristic impedance of the network.

Embodiments of the foregoing aspects of the invention may include one or more of the following features. During the first period of time, the compensation device provides real power and reactive power to the utility power network. After the second period of time, the reactive power from the compensation device is non-discontinuously decreased to the steady-state power delivery characteristic. The factor N is generally determined on the basis of a transient thermal capacity characteristic (e.g., a 1% rating) of the compensation device. The second period of time is determined on the basis of the ability of the compensation device to absorb thermal energy. The ramp down profile may be determined on the basis of the characteristic impedance of the network. The characteristic impedance of the network may be determined using known characteristics of the network. Alternatively, the reactive power compensation device can apply a stimulus to the network and a response measured.

These and other features and advantages of the invention will be apparent from the following description, drawings and claims.

DETAILED DESCRIPTION

Figure 1:
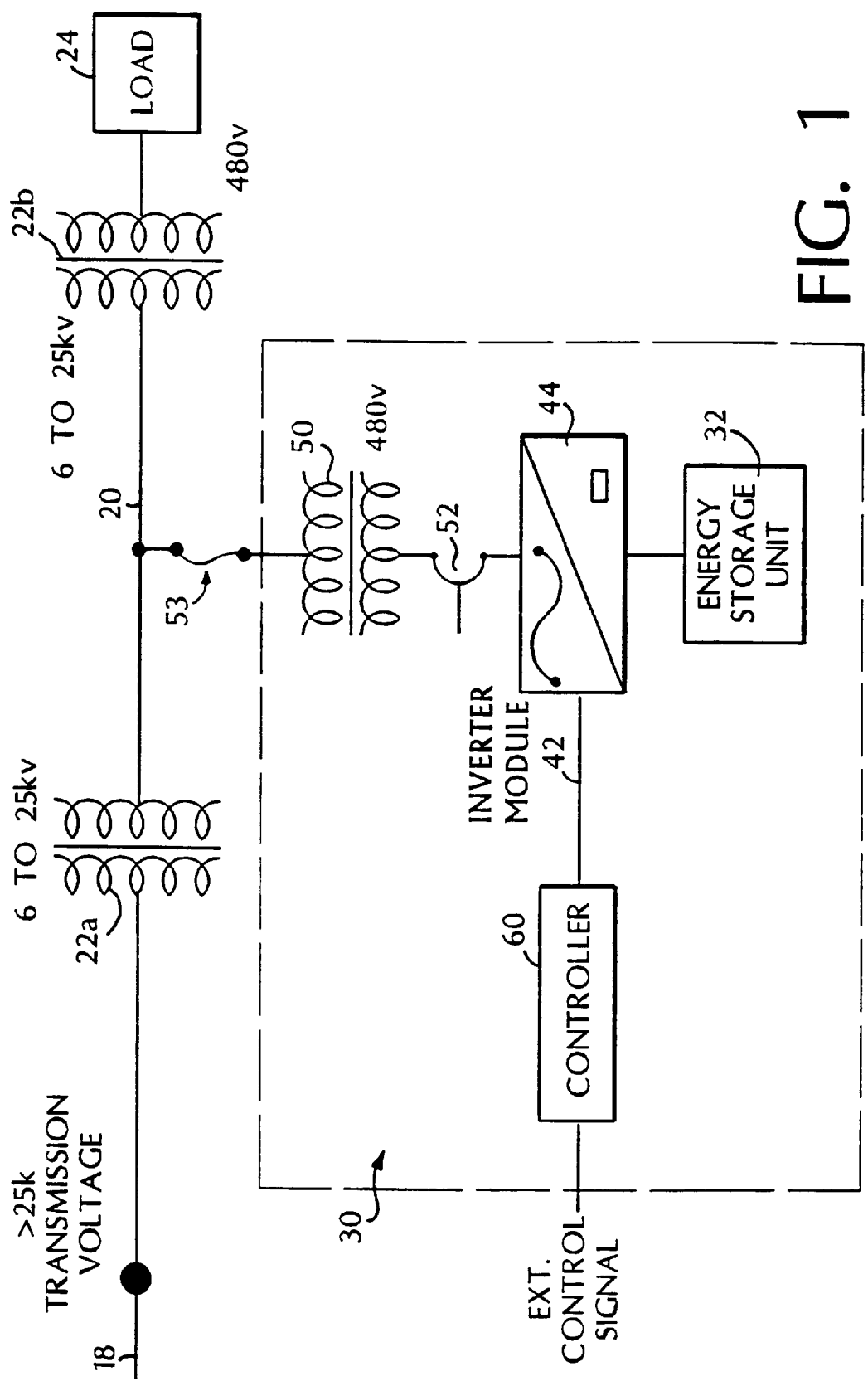
FIG. 1 is a block diagram showing a reactive power compensation device, here an inverter, and an energy storage unit connected to a utility power network through the inverter.

Referring to FIG. 1, a power compensation system 30 is shown connected in shunt with a distribution line 20 of a utility power network. Distribution line 20 is connected to a transmission line 18 on a transmission line network through a first transformer 22a, which steps-down a relatively high voltage (e.g., greater than 24.9 kV carried on transmission line 18) to a lower voltage, here 6 kV. A second transformer 22b steps-down the 6 kV voltage to a voltage suitable for a load 24, here 480 V.

Power compensation system 30 includes an energy storage unit 32, an inverter system 44, and a controller 60. Energy storage unit 32 may be a part of a D-SMES (Distributed SMES) module which, together with inverter system 44, is capable of delivering both real and reactive power, separately or in combination, to distribution line 20. In this embodiment, the DSMES module is sized at 3.0 MVA and is capable of delivering an average of 2 MWatts for periods as long as 400 milliseconds, 7.5 MVA for a full second, and 3.0 MVAR of reactive power for an indefinite period of time. As described below, inverter 44, under the intelligent control of controller 60, transfers reactive power to and from the utility power network.

Figure 2:
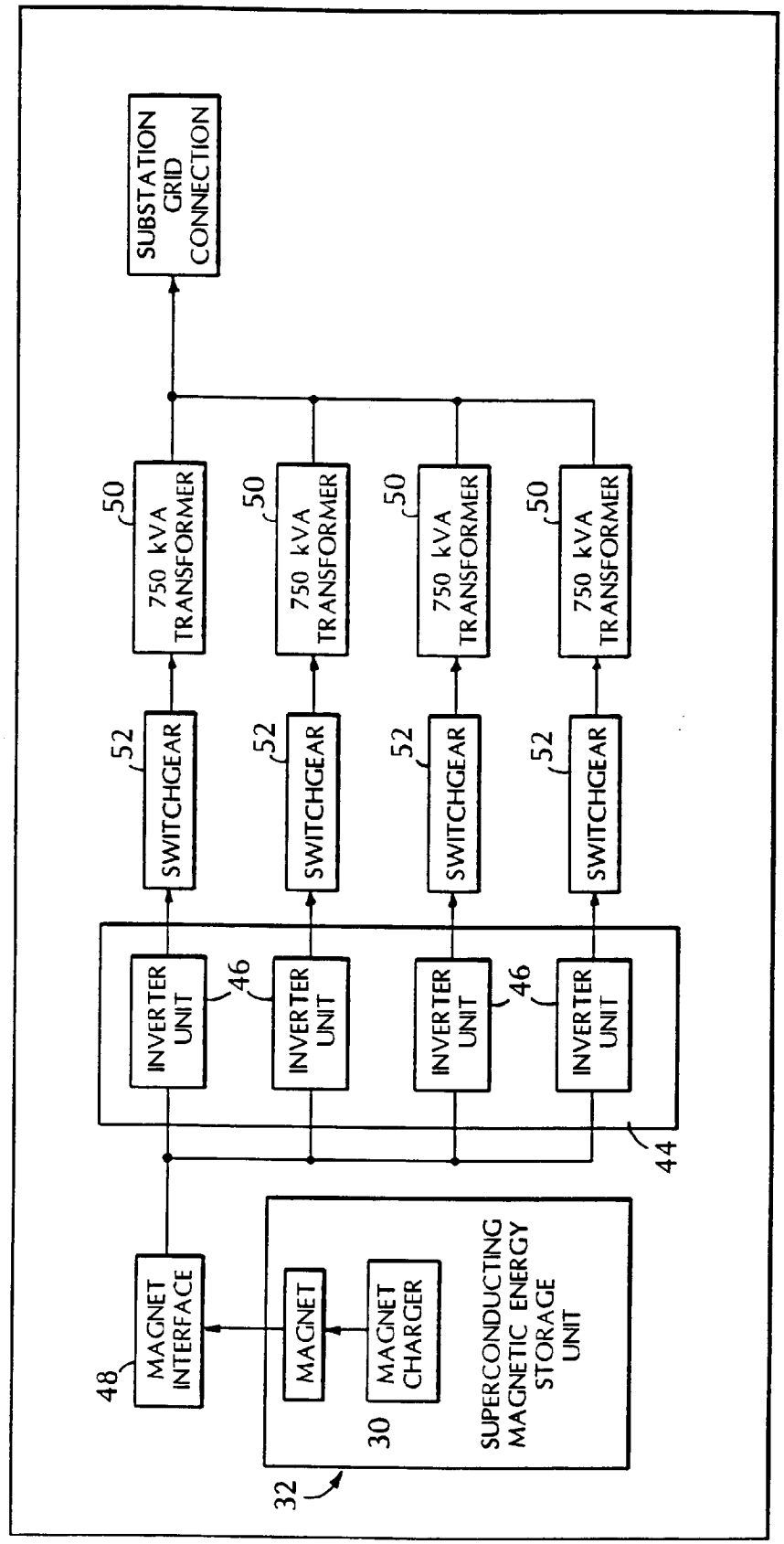
FIG. 2 is a block diagram of the inverter and energy storage unit of FIG. 1.

Referring to FIG. 2, inverter 44 converts DC voltage from energy storage unit 32 to AC voltage and, in this embodiment, includes four inverter units 46. Inverter 44 can act as a source for leading and lagging reactive power. In general, inverter 44 can only source real power from energy storage unit 32 for as long as real power is available. However, inverter 44 can source reactive power indefinitely assuming it is operating at its nominally rated capacity. Thus, inverter 44 can provide reactive power without utilizing power from energy storage unit 32. One example of an inverter that may be used in conjunction with the processes described herein may be obtained from Integrated Electronics, a division of American Superconductor Corp. (Part No. A0016701CH). However, the invention is not limited to use with this type of inverter and any other type of inverter may instead be used. Further details regarding the arrangement and operation of the D-SMES module and inverter 44 can be found in co-pending U.S. patent application Ser. No. 09/449,435, which was incorporated herein by reference above.

Each of the four inverter units 46 is capable of providing 750 KVA continuously and 1.875 MVA in overload mode for one second. The outputs of each inverter unit 46 are combined on the medium-voltage side of the power transformers to yield system ratings in accordance with the following table.

| Power Flow | Value | Duration |
| --- | --- | --- |
| MVA delivered, leading or lagging | 3.0 | Continuously |
| MVA delivered, leading or lagging, overload condition | 7.5 | 1–2 seconds in event of transmission or distribution fault detection |
| Average MW delivered to utility (for an exemplary D-SMES module). | 2.0 | 0.4 seconds in event of transmission or distribution fault detection |

Each inverter unit 46 includes three parallel inverter modules (not shown). Because inverter units 46 are modular in form, a degree of versatility is provided to accommodate other system ratings with standard, field-proven inverter modules. A level of fault tolerance is also possible with this modular approach, although system capability may be reduced. Each inverter module 46 is equipped with a local slave controller (not shown) that manages local functions, such as device protection, current regulation, thermal protection, power balance among modules, and diagnostics, among others. The inverter units and modules are mounted in racks with integral power distribution and cooling systems.

Inverter 44 is coupled to distribution line 20 through one or more step-down power transformers 50 and one or more switchgear units 52 (see also FIG. 1). Each power transformer 50 is a 24.9 kV/480 V three-phase oil-filled pad mount transformer having a nominal impedance of 5.75% on its own base rating. The power transformers are mounted outdoors adjacent to the system enclosure with power cabling protected within an enclosed conduit (not shown). As is shown in FIG. 1, a fuse 53 is connected between step-down power transformer 50 and distribution line 20.

Referring back to FIG. 2, each switchgear unit 52 provides over-current protection between power transformers 50 and inverter units 46. Each of the four main inverter outputs feeds a circuit breaker rated at 480 V, 900 A RMS continuous per phase with 45 kA interruption capacity. Switchgear units 52 also serve as the primary disconnect means for safety and maintenance purposes. The switchgear units are generally mounted adjacent to the inverter unit enclosures.

Referring again to FIG. 1, system controller 60 is a multiprocessor-driven system, which utilizes adaptive control processes. System controller 60 operates as a multi-state machine for processing inputs from distribution line 20 via line 42 and inverter units 46 of inverter system 44. System controller 60, as a function of unit inputs and predetermined internal control rules, dynamically determines the phase and magnitude of inverter units 46 as well as the real power output of D-SMES module 30. System controller 60, in operation, passes real-time voltage and current waveform data to the data acquisition system for processing and transmission to monitoring sites. System controller 60 also supports local user interfaces and safety interlocks. Controller 60 necessarily has a response time sufficient to ensure that the transfer of power to or from energy storage unit 32 occurs at a speed to address a fault or contingency on the utility system.

Figure 3:
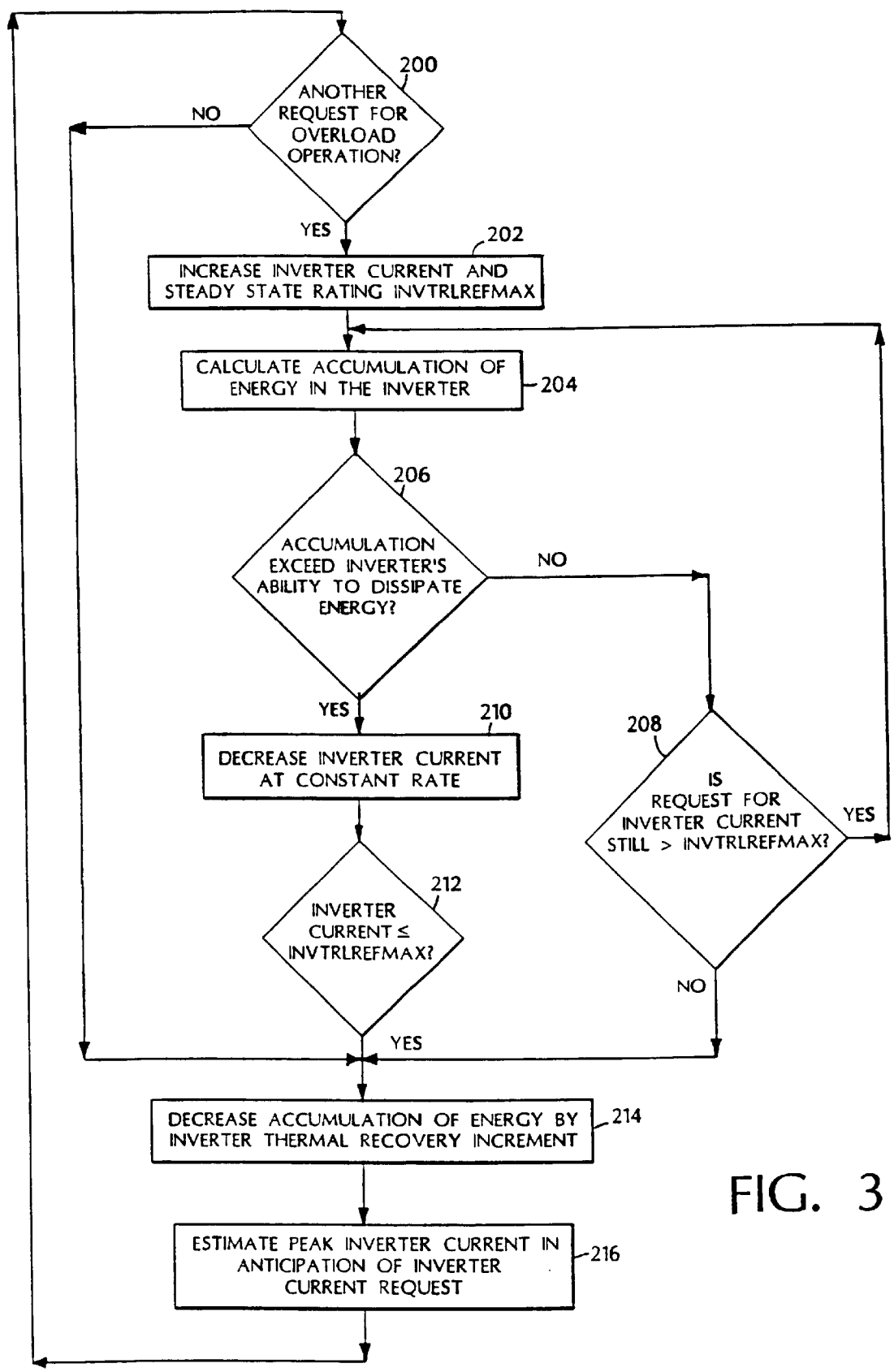
FIG. 3 is a flow diagram illustrating operation of the inverter of FIG. 1.
Figure 4:
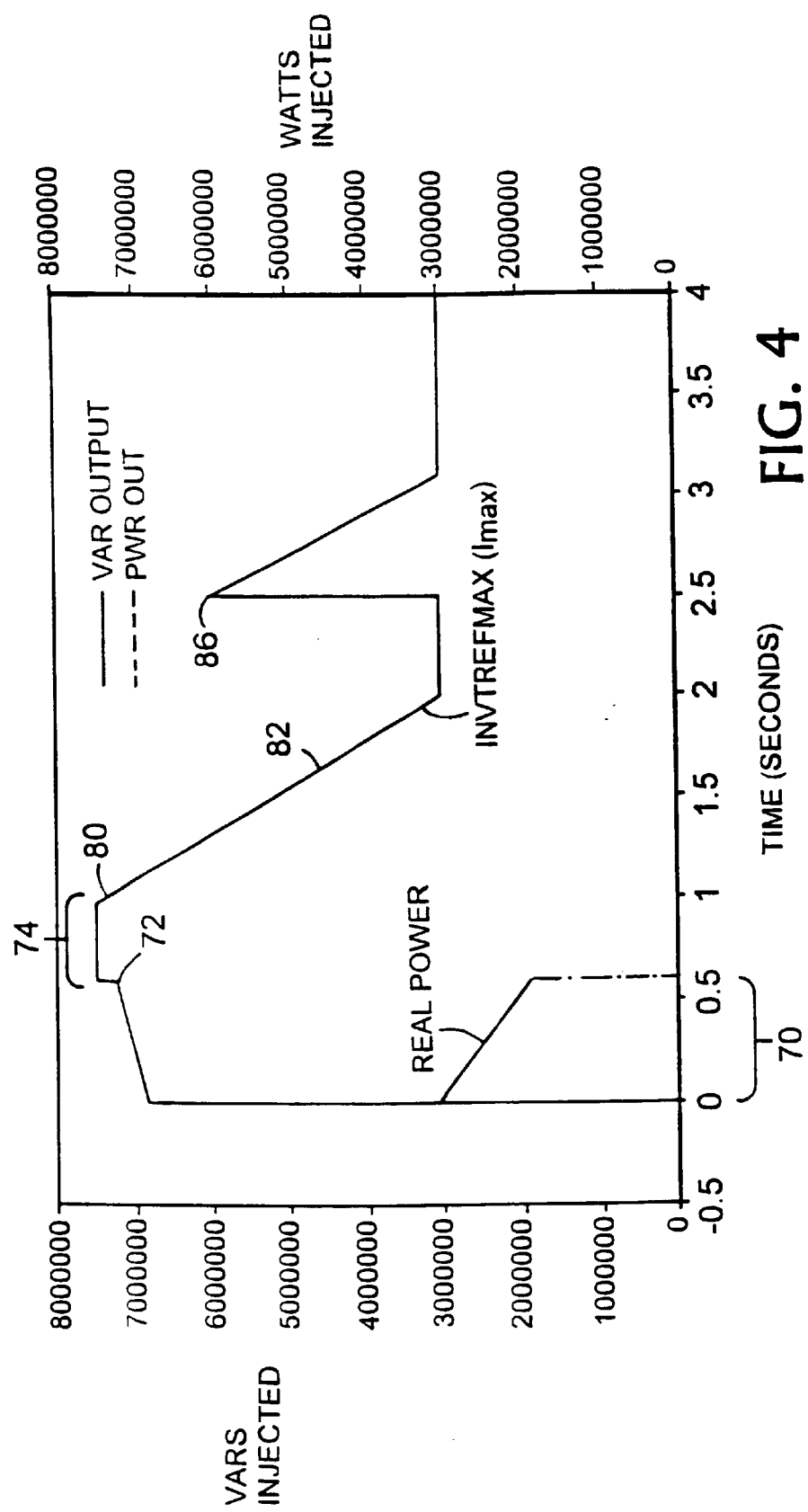
FIG. 4 is a graph illustrating real and reactive output power characteristics of the inverter as a function of time.

With reference to FIGS. 3 and 4, the operation of controller 60 and inverter 44 is described in conjunction with an exemplary contingency occurring on the utility power network. At the outset, the nominal voltage of the utility power network is monitored. For example, the nominal voltage on distribution line 20 is sensed either directly or from a remote device. When the nominal voltage has dropped below a predetermined threshold value (e.g., 90%), a request is made to operate inverter 44 in overload mode (200) and, in response, controller 60 transmits a trigger signal to cause inverter 44 to increase its output current above its steady-state rating (202). This steady-state rating is referred to in the figures as InvtrIRefMax/$I_{max}$.

Referring to FIG. 4, inverter system 44 is activated to provide capacitive reactive power and real power from energy storage unit 32. In the example depicted in FIG. 4, the energy storage unit delivers 3 MWatts of real power and about 6.8 MVARs of capacitive reactive power. After inverter 44 is activated, the real power is decreased in a period 70, here the decrease is linear, to about 2 MWatts as the magnet discharges. During period 70 (e.g., 600 milliseconds) in which the real power is decreased, the capacitive reactive power is increased from 6.8 MVARs to about 7.2 MVARs. When energy storage unit 32 reaches its cut-off current level, controller 60 provides a signal to inverter 44 to stop delivery of real power. The cut-off current level of the energy storage unit 32 represents a power level of the energy storage unit that should be maintained for reasons relating to the reliability of the energy storage unit. That is, the energy storage unit 32 is generally not allowed to drop below this cut-off current level. At this point (point 72 of FIG. 4), capacitive reactive power is increased to comprise the entire maximum overload value for a period 74 (e.g., 400 milliseconds).

Figure 5:
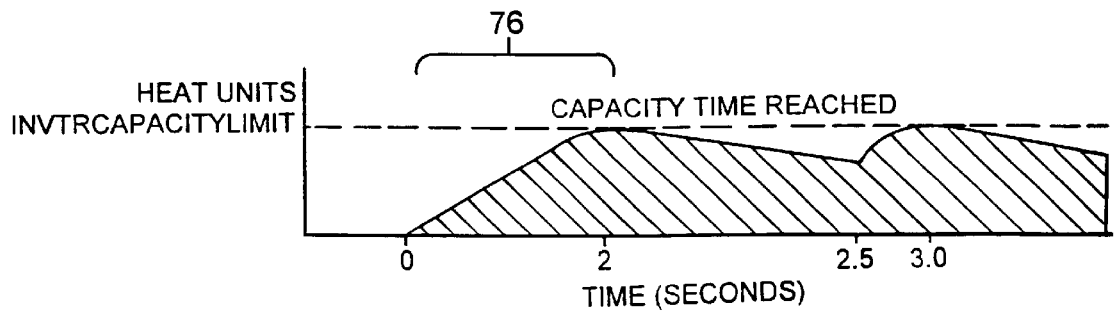
FIG. 5 is a graph illustrating the thermal capacity characteristic of the inverter as a function of time for the output power characteristic.

Referring to FIG. 5, the thermal heat capacity of inverter 44 is shown as a function of time. The inverter's ability to dissipate energy is referred to in the figures as InvtrCapacityLimit, which, if exceeded, will lead to destruction of the inverter. At point 80 (FIG. 4), controller 60 controls inverter 44 to begin decreasing its output current, since the inverter has reached its maximum thermal heat capacity.

As can be seen from FIGS. 4 and 5, although the output current of the inverter rises sharply from the non-overloaded, steady-state mode to the overload mode, the heat energy rises gradually over a period 76 (FIG. 5). Thus, this period of time can be used to provide a substantially greater amount of power to the utility power network than is normally available in the steady-state mode. During this time period, controller 60 controls inverter 44 so that the thermal limit of the inverter is not exceeded.

Referring again to FIG. 4, to ensure precise control of inverter 44, upon increasing the output current level of inverter 44, controller 60 begins to compute the accumulation of energy being dissipated in inverter 44 (204). This calculation is performed once every line cycle. To calculate the accumulation of energy dissipation (i.e., power dissipation per unit time) in the inverter, it is recognized that dominant loss mechanisms are proportional to $I^2$ (inverter current squared). To obtain the accumulated energy, the power being dissipated over time is integrated over all samples. The sampled data equivalent of a continuous time system is a summation of samples of the power quantity, which is multiplied by the sample time interval as follows:

$$\frac{1}{f_s} \cdot \sum_n I_n \cdot I_n,$$

where $1/f_s = t_s$, the sample period and $I_n$ is the sampled instantaneous inverter current.

To obtain a value that is proportional to the energy that is dissipated above the rated, steady-state dissipation capability of the inverter (i.e., a value related to the transient thermal capacity limit), a ratio of the instantaneous inverter current ($I_n$) to the steady state limit ($I_{max}$=InvtrIRefMax) is obtained as follows:

$$\frac{1}{f_s} \cdot \sum_n \left(\frac{I_n}{I_{max}}\right) \cdot \left(\frac{I_n}{I_{max}}\right) = \frac{1}{f_s} \cdot \sum_n \left(\frac{I_n}{I_{max}}\right)^2 \quad (1)$$

This expression represents the accumulated thermal energy of the inverter, a static variable that is updated every AC line cycle. Calculation of the accumulation of energy continues, as shown by the dotted line of FIG. 3.

Referring again to FIG. 4, once the period of time 74 has expired, the capacitive reactive power is decreased in ramp-like fashion—here, linearly—to a steady-state value (e.g., 3 MVARs). The capacitive reactive power is decreased in this manner to avoid an abrupt, step-like change in the reactive power transfer to the utility power network. A step-like abrupt change in the inverter current from, for example, 2.5 times the steady-state maximum to the steady-state maximum, can generate undesirable transients (e.g., ringing oscillations) on the utility power network, which can cause false switching and possible damage to equipment on the utility power network. Thus, the current is steadily decreased in accordance with the ramp-like profile (210). The ramp-down process is initiated at a time that ensures that when the inverter current reaches the steady-state maximum value (InvtrIRefMax), the thermal capacity limit of the inverter is exhausted. Selecting the ramp-down profile in this manner provides maximum power delivery to the load and reduces the probability of line voltage collapse, while also guarding against initiating undesirable transients on the network.

The ramp-down profile is typically a function of the characteristic impedance of the utility network to which it is connected. However, the characteristic impedance of a network changes unpredictably over time. In one approach, a suitable characteristic impedance value of the network can be derived from knowledge of the types of loads, conductors, reactive devices and transformers connected to the network. Alternatively, the characteristic impedance of the network can be determined by periodically applying a stimulus (e.g., a step function load) to the network and measuring the response of the network. In particular, inverter 44 can be used to apply the step function load, while controller 60 measures the response. Of course, the step function load would be of sufficiently low magnitude to prevent stimulation of undesirable oscillations. The characteristic impedance is then used to determine the ramp-down profile.

The summation of each cycle of inverter heat energy being accumulated must be calculated for each AC line cycle beginning with the initiation of the overload current above the steady-state maximum value. This summation is mathematically simple. But, the accumulation must also be dynamically estimated for each remaining cycle of the ramp-down process in order to be able to determine when to initiate the processes, as well as to ensure that ramp-down is proceeding such that the inverter's heat capacity limit will not be exceeded. Because the value of inverter current is controlled and predictable for each cycle of the process, a conceptually straightforward summation of each of the heat contributions during each of these cycles can be performed, but not without significant mathematical overhead, in practice. However, this mathematically intensive calculation can be simplified dramatically using the closed form approach described below. Simplifying this calculation permits the use of a less costly controller and/or significantly conserves the controller's bandwidth for other tasks.

Figure 6:
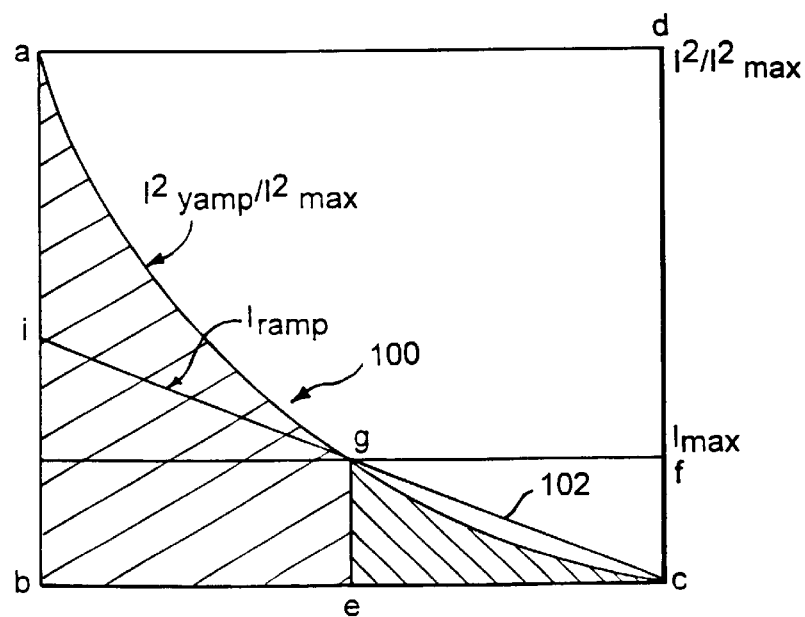
FIG. 6 is a graph modeling the thermal capacity characteristic of the inverter during a ramp-down process.

Referring to FIG. 6, parabolic curve 100 represents the $I^2$ value of inverter 44, as a function of time. The area under parabolic curve 100 bounded by points abcga represents the energy dissipated as the inverter current ramps from the value of I to zero along ramp profile 102. However, of interest is the area bounded by points abega, which represents the energy dissipated as the inverter current decreases from the value of I to $I_{max}$. To obtain the area bounded by points abega, the area bounded by points gecg is first obtained by recognizing that this area is exactly ⅓ the area of rectangle bounded by the points gecfg. The area bounded by the points abega is then obtained by subtracting the area bounded by points gecg from the area bounded by the points abcga. The closed form expression is represented as:

$$\frac{1}{3} \cdot \frac{1}{f_s} \cdot \frac{1}{AmpsPerCycle} \cdot \left( \frac{I^3}{InvtrIRefMax^3} - InvtrIRefMax \right) \quad (2)$$

where I is the inverter current, InvtrIRefMax(=$I_{max}$) is as defined above, and AmpsPerCycle is the slope of the ramp-down of the current. The foregoing expression represents the thermal capacity predictor for determining when the inverter must begin or continue the ramp-down of overcurrent toward the maximum steady-state value.

The final expression for limiting the overcurrent period of inverter 44 is the sum of equations (1) and (2), as follows:

$$\frac{1}{f_s} \cdot \left[ \sum_n \left[ \left( \frac{I_n}{InvtrIReMax} \right)^2 \right] \right] + \frac{1}{3 \cdot f_s} \cdot \frac{(I - InvtrIRefMax)}{AmpsPerCycle} \cdot \frac{I^2}{InvtrIRefMax^2}$$

Note that the slope of the thermal energy content (heat content) of the inverter gradually declines during the ramp-down period in which the capacitive reactance from inverter 44 is reduced, and the slope becomes negative only after the inverter current reaches its maximum steady-state rating.

At this point, the process has computed the accumulation of energy being dissipated in the inverter through regions 74 and 82. Region 74 refers to that part that has actually accumulated, while region 82 represents the estimated accumulation that will occur from the current sample until the inverter current reaches the steady-state level. Samples are accumulated once per cycle for both regions 74 and 82, although the accumulation in region 82 is for estimation purposes. Moreover, inverter 44 generally cannot dissipate its heat at the same rate that the power delivered to the utility network is reduced. Thus, controller 60 must have sufficient intelligence to recognize that, in the event of a subsequent contingency, the thermal energy content of the inverter may not have decreased back to a level corresponding to the steady-state current level.

When the inverter current declines to the InvtrIRefMax level (212) (FIG. 3), the inverter will begin to cool. To reflect the cooling process, the accumulation procedure must be modified. In particular, although accumulation of heat energy is still computed, what is accumulated is a recovered capacity rather than an extended capacity. To do this, controller 60 begins the process by selecting (214) an incrementally higher value of estimated inverter current than the level of InvtrIRefMax (the maximum steady-state value) and using this value as if it were the actual inverter current. By using this value in the heat accumulation estimation process described above, controller 60 can verify whether the estimated current can be successfully reduced to InvtrIRefMax quickly enough so as not to exceed the thermal capacity limit of the inverter (in the event that a subsequent request for an over-current is required). In particular, controller 60 determines whether the inverter thermal capacity limit will be exceeded if the ramp-down process were to be initiated at the incrementally-larger estimated current level previously mentioned. If it is not exceeded, a constant value is subtracted from the accumulation of heat energy (216) and the value of the current is incremented by the value depicting the slope of the ramp-down process, called AmpsPerCycle. The estimate is again performed at the next sample period. The constant value represents the inverter's thermal recovery increment, a value that essentially gauges the state of recovery of the inverter from the overload. If the estimated current results in a prediction that exceeds the inverter's heat capacity limit, the thermal recovery increment is still decremented by the constant value, provided that the inverter current is actually at or below InvtrIRefMax, but the inverter current estimate remains unchanged, as it is used to constrain the peak current if a new overload current is requested. The process continues and, eventually, the full overload thermal capability of the inverter is restored and the overload current reaches its limit of N times the steady-state rating.

Thus, controller 60 controls inverter 44 to provide a maximum amount of inverter current should another contingency occur. Controller 60 does so without exceeding the capability the inverter and by providing a ramping-down to the steady state InvtrIRefMax level, while ensuring that the thermal capacity of the inverter is not exceeded by the time that the current declines to the InvtrIRefMax level.

For example, as shown in FIG. 4, a second follow-on contingency (point 86) may occur while the thermal capacity is still elevated. In this case, when inverter 44 is controlled to provide additional reactive power to the utility power network, the inverter current cannot be increased to the previous 750 MVAR level because the pre-established slope of the ramp down would result in the thermal capacity of the inverter being exceeded before reaching InvtrIRefMax. Thus, the inverter current is limited to, in this example, approximately 600 MVARs (point 86). At this peak inverter current, the inverter current can still decrease at the ramp down rate to InvtrIRefMax without, as shown in FIG. 5, exceeding the thermal limit of the inverter.

Other embodiments not explicitly described herein are also within the scope of the claims. For example, in the embodiment described above in conjunction with FIG. 1, an energy storage unit 32 was used to provide real power during period 70. However, in certain applications, inverter 44 may be used without an energy storage unit in order to solely provide reactive power compensation.

What is claimed is:

1. A system for use with a reactive power compensation device connected to a utility power network carrying a nominal voltage, the system comprising:
   a controller which controls the reactive power compensation device to deliver, for a first period of time and in response to a detected change in the nominal voltage, reactive power, real power, or both real and reactive power to the utility power network;
   wherein, in a second period of time following the first period of time, the controller controls the reactive power compensation device to provide reactive power to the utility power network at a level that is a factor N (N>1) greater than a maximum power capability characteristic of the reactive power compensation device.

2. The system of claim 1, wherein, during the second period of time, the reactive power compensation device provides real power to the utility power network.

3. The system of claim 2, wherein the controller controls the reactive power compensation device to non-discontinuously decrease the reactive power to a steady-state power delivery characteristic after the second period of time.

4. The system of claim 3, wherein a slope of the non-discontinuously decreasing reactive power is determined on the basis of a characteristic impedance of the utility power network.

5. The system of claim 1, wherein the factor N is determined on the basis of a transient thermal capacity characteristic of the reactive power compensation device.

6. The system of claim 5, wherein the transient thermal capacity characteristic is represented by an $I^2t$ rating of the reactive power compensation device.

7. The system of claim 1, wherein a sum of the first period of time and the second period of time is determined on the basis of the ability of the reactive power compensation device to absorb thermal energy.

8. A method of providing power compensation from a power compensation device to a utility power network carrying a nominal voltage, the power compensation device having a steady-state power delivery characteristic, the method comprising:
   detecting a change of a predetermined magnitude in the nominal voltage on the utility power network;
   controlling the power compensation device to deliver, for a first period of time and in response to the detected change in the nominal voltage, reactive power, real power, or both real and reactive power to the utility power network; and
   controlling the power compensation device to deliver, for a second period of time following the first period of time, reactive power to the utility power network at a level that is a factor N (N>1) greater than the steady-state power delivery characteristic of the power compensation device.

9. The method of claim 8, wherein, during the second period of time the power compensation device provides real power to the utility power network.

10. The method of claim 9, further comprising, after the second period of time, non-discontinuously decreasing the reactive power from the power compensation device to the steady-state power delivery characteristic.

11. The method of claim 10, further comprising determining a slope of the nondiscontinuously decreasing reactive power on the basis of a characteristic impedance of the utility power network.

12. The method of claim 11, wherein the characteristic impedance of the utility power network is determined on the basis of known characteristics of the utility power network.

13. The method of claim 11, further comprising determining the characteristic impedance of the utility power network by applying a stimulus to the network and measuring a response to the stimulus.

14. The method of claim 8, wherein the factor N is determined on the basis of a transient thermal capacity characteristic of the power compensation device.

15. The method of claim 14, wherein the transient thermal capacity characteristic is represented by an $I^2t$ rating of the power compensation device.

16. The method of claim 8, wherein the second period of time is determined on the basis of the ability of the power compensation device to absorb thermal energy.

* * * * *